United States Patent [19]

Doerge et al.

[11] Patent Number: 5,102,920

[45] Date of Patent: Apr. 7, 1992

[54] NOVEL AZEOTROPES AND THE USE THEREOF IN THE PRODUCTION OF RIGID FOAMS

[75] Inventors: Herman P. Doerge, Pittsburgh; Keith G. Spitler, Burgettstown; Charles E. Mortimer, Tarentum, all of Pa.

[73] Assignee: Mobay Corporation, Pittsburgh, Pa.

[21] Appl. No.: 757,749

[22] Filed: Sep. 11, 1991

Related U.S. Application Data

[62] Division of Ser. No. 505,813, Apr. 6, 1991.

[51] Int. Cl.$^5$ ............................................. C08J 9/14
[52] U.S. Cl. ......................... 521/131; 252/172; 521/98; 521/910
[58] Field of Search ............ 521/131, 98, 910; 252/172

[56] References Cited

U.S. PATENT DOCUMENTS

| | | | |
|---|---|---|---|
| 3,072,582 | 1/1963 | Frost | 260/2.5 |
| 3,091,551 | 5/1963 | Robertson | 117/105.5 |
| 3,153,002 | 10/1964 | Wismer et al. | 260/2.5 |
| 3,249,546 | 5/1966 | Eiseman, Jr. | 252/67 |
| 3,391,093 | 7/1968 | Frost | 260/2.5 |
| 3,524,825 | 8/1970 | Rill, Jr. | 260/2.5 |
| 3,745,203 | 7/1973 | Harper | 264/48 |
| 3,846,347 | 11/1974 | Satterly | 260/2.5 AF |
| 4,055,507 | 10/1977 | Dastur et al. | 252/162 |
| 4,055,521 | 10/1977 | Taub et al. | 260/2.5 AF |
| 4,076,644 | 2/1978 | Burt | 252/182 |
| 4,248,975 | 2/1981 | Satterly | 521/110 |
| 4,710,521 | 12/1987 | Soukup et al. | 521/131 |
| 4,795,763 | 1/1989 | Gluck et al. | 521/99 |
| 4,954,290 | 9/1990 | Bartlett et al. | 252/305 |
| 4,981,879 | 1/1991 | Snider | 521/131 |
| 4,994,202 | 2/1991 | Merchant | 521/131 |

FOREIGN PATENT DOCUMENTS

| | | |
|---|---|---|
| 1288312 | 1/1969 | Fed. Rep. of Germany . |
| 1141995 | 11/1987 | Japan . |
| 1141996 | 11/1987 | Japan . |

OTHER PUBLICATIONS

Dishart and Creazzo "The DuPont Program on Fluorocarbon Alternative Blowing Agents for Polyurethane Foams"—pp. 59-66.

Primary Examiner—Morton Foelak
Attorney, Agent, or Firm—Joseph C. Gil; Lyndanne M. Whalen

[57] ABSTRACT

The present invention is directed to a novel azeotrope consisting essentially of from 25 to 35% by weight of 2-methylbutane and from 65 to 75% by weight of 1,1-dichloro-1-fluorethane, and the use thereof in the production of rigid, closed cell foams.

3 Claims, 1 Drawing Sheet

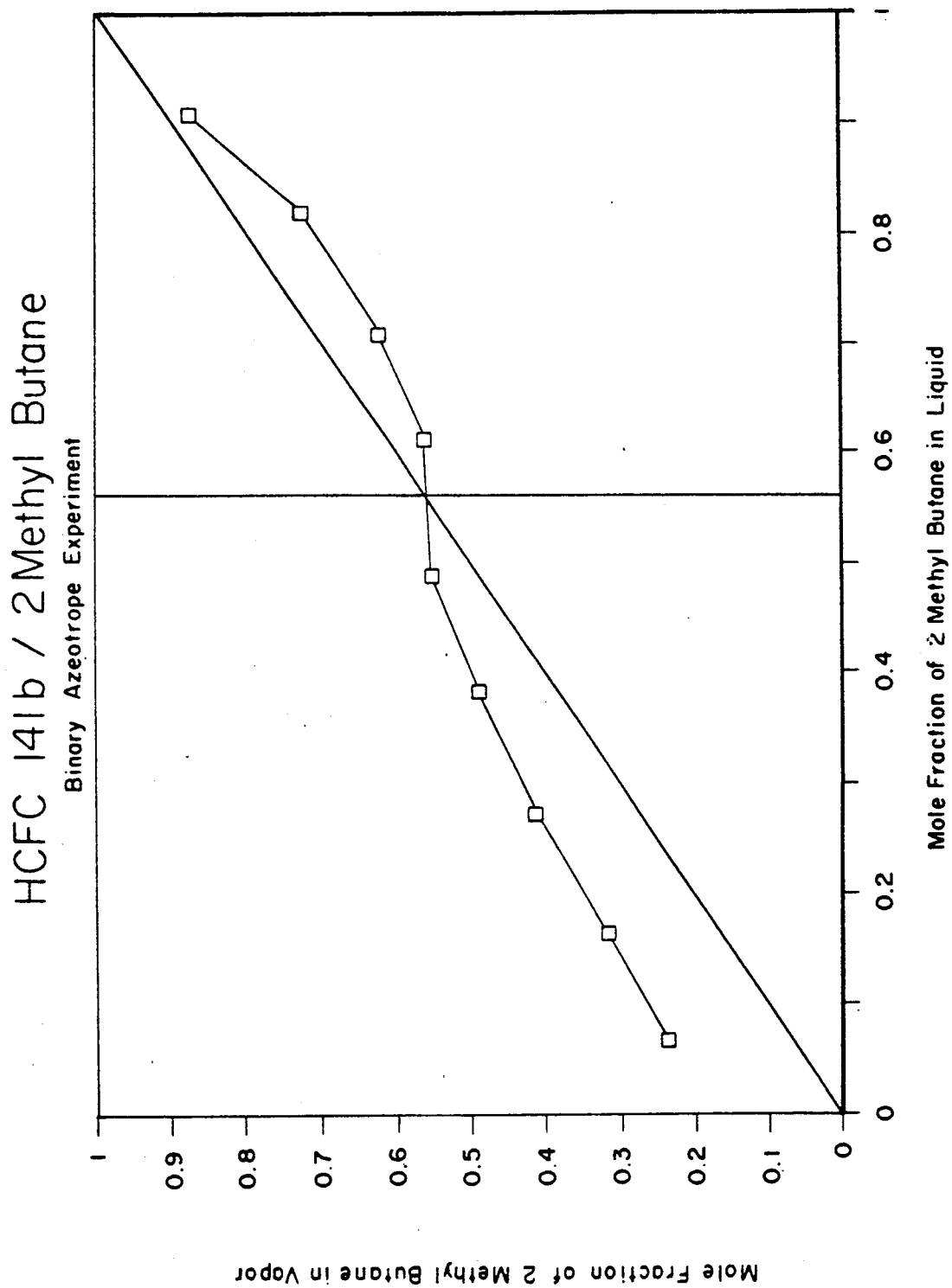

NOVEL AZEOTROPES AND THE USE THEREOF IN THE PRODUCTION OF RIGID FOAMS

This application is a division, of application Ser. No. , 07/505,813 filed Apr. 6, 1991.

BACKGROUND OF THE INVENTION

The use of trichloromonofluoromethane ("CFF-11") in the production of closed cell, rigid polyurethane and polyisocyanurate foams is well known (see, e.g., U.S. Pat. Nos. 3,072,582; 3,091,551; 3,153,002; 3,524,825; 3,846,347; and 4,248,975). Recently, the urethane foam industry has been investigating methods for reducing the amount of CFC-11 used in producing rigid foams.

U.S. Pat. No. 3,745,203 describes the production of polyurethane moldings using a mixture of two volatile blowing agents. The least volatile of the blowing agents has a boiling point of from 30° F. to 120° F., while the more volatile blowing agent in the mixture has a boiling point of from −50° F. to 500° F. The difference between the boiling points of the two blowing agents in the mixture is from 30° F. to 150° F.

German Auslegeschrift 1,288,312 describes the use of an azeotrope of CFC-11 and isopentane as a blowing agent (U.S. Pat. No. 3,249,546 describes the azeotrope (itself).

U.S. Pat. No. 4,055,521 describes a blowing agent which is a mixture of CFC-11, isopentane, and methylene chloride.

U.S. Pat. No. 3,391,093 describes the use of halogenated blowing agents which generally have boiling points below about 80° F. for producing polyurethane foams. The reference does indicate that low molecular weight hydrocarbon gases can be used with the halogenated blowing agents. U.S. Pat. No. 4,795,763 broadly indicates that mixtures of halohydrocarbons and hydrocarbons can be used as blowing agents for polyurethane foams.

It has also been suggested that 2,2-dichloro-1,1,1-trifluoroethane ("HCFC-123") and 1,1-dichloro-1-fluoroethane ("HCFC-141b") can be used as blowing agents for rigid polyurethane foams (See, e.g., Dishart et al, "The DuPont Program on Fluorocarbon Alternative Blowing Agents for Polyurethane Foams," POLYURETHANES WORLD CONGRESS 1987-SEPT. 29-OCT. 2, 1987, pages 59–66, and U.S. Pat. No. 4,076,644).

The use of a mixture of a chlorofluorocarbon having an atmospheric boiling point of from about 74° F. to about 120° F. and an alkyl alkanoate having a molecular weight of no more than about 88 as a blowing agent has been described in U.S. application Ser. No. 321,032, filed on Mar. 9, 1989. Among the chlorofluorocarbons described are HCFC-123 and HCFC-141b. Among the alkyl alkanoates described is methyl formate.

Finally, various compositions based on halogenated hydrocarbons are known for use as cleaning solvents. For example, U.S. Pat. No. 4,055,507 describes the use of an azeotropic mixture of 1,2-dichloro-1,1-difluoroethane and 3-methylpentane. Japanese 1,141,995 (abstract only) describes an azeotropic mixture of 67% to 87% by weight of HCFC-123 and 13% to 33% by weight of 2-methylbutane. Japanese 1,141,996 (abstract only) describes an azeotropic mixture of HCFC-141b and a member selected from the group n-pentane, 2-methylbutane and 2,2-dimethylbutane.

BRIEF DESCRIPTION OF THE DRAWING

The drawing is a graph showing a plot of the mole fraction of 2-methylbutane in the liquid phase versus the mole fraction of 2-methylbutane in the vapor phase of a mixture refluxing at steady state at one atmosphere.

DESCRIPTION OF THE INVENTION

The present invention is directed to an azeotropic composition which is eminently suitable for production of rigid foams. In addition, the azeotropic compositions of the present invention are well suited for solvent cleaning applications. More particularly, the present invention is directed to an azeotrope-like composition consisting essentially of from 25% to 35% by weight of 2-methylbutane and from 65% to 75% by weight of 1,1-dichloro-1-fluoroethane.

The compositions of the present invention consist essentially of 2methyl butane (b.p. 28° C.) and 1,1-dichloro-1-fluoroethane (b.p. 32° C.). This latter material is known in the nomenclature conventional in the chlorofluorocarbon filed as hydrochlorofluorocarbon 141b. The 2-methylbutane used can be of normal commercial purity which typically contains at least 95% 2-methylbutane. The present mixture of 25% to 35% 2-methylbutane and 65% to 75% 141b is azeotropic in nature in that compositions within this range exhibit a substantially constant boiling point. Being substantially constant boiling, the mixture does not tend to fractionate to any great extent upon evaporation. After evaporation, only a small difference exists between the composition of the vapor phase and the composition of the initial liquid phase. This difference is so small that the compositions of the vapor and liquid phases are considered substantially identical. Accordingly, any mixture within the above noted range exhibits properties which are characteristic of a true binary azeotrope. Compositions consisting essentially of from 27% to 33% by weight 2-methylbutane and 67% to 73% by weight of 141b have been found to exhibit particularly satisfactory performance. The composition consisting of 30.4% % by weight of 2-methylbutane and 69.6% by weight of 141b has been established, within the accuracy of the boiling point determination procedure, as the true binary azeotrope with a boiling point of about 25.7° C.

The drawing shows a graph plotting the mole fraction of 2-methylbutane in the liquid phase versus the mole fraction of 2-methylbutane in the vapor phase of a mixture refluxing at steady state at 1 atmosphere. These mole fractions were obtained by gas chromatography and were adjusted to be quantitative by using a calibration curve as described below. The point at which this mole fraction curve crosses the line with slope 1 and intercept 0 is, by definition of an azeotrope, the true binary azeotropic composition.

A series of blends of 2-methylbutane with 141b were prepared from 0 to 100 mole percent of 2-methylbutane in 10% increments. First, each blend was injected into a Perkin-Elmer Gas Chromatograph ("GC") to establish a correlation between relative peak areas versus actual molar concentrations. This procedure was done by making duplicate blends and measuring each blend twice. This established the calibration curve as well as a 95% confidence interval which was used to establish the error about the expected azeotropic composition. Secondly, each blend was gently heated in a distillation pot and refluxed for 10 minutes in the apparatus described above. The reflux condenser was kept at 10° C.

and was open to the atmosphere through a drying tube. Once steady state was achieved, samples of the liquid and vapor were taken through the sample ports in the apparatus, with the liquid samples being taken from the distillation pot and the vapor samples taken at the base of the condenser. Liquid and vapor temperatures were also taken from the pot and from a point between the pot and the condenser and were recorded. Duplicate samples were injected into the GC and the relative peak areas recorded. These relative peak areas were converted to mole fractions using the calibration curve. The data was plotted with the resultant graph being shown in the drawing. An azeotrope is defined as the mixture of liquids where, at the boiling point, the concentration of the components is the same in the liquid and vapor phases. Therefore, the point at which the mole fraction plot crosses the line of slope 1 and intercept 0 is the expected azeotropic composition.

The compositions are suitable for solvent cleaning applications and as blowing agents for rigid foams.

The present invention is also directed to the discovery that the azeotrope described herein is eminently suitable for the production of closed cell, rigid foams. The resistant foams are substantially lower in density than foams produced from trichloromonofluoromethane alone, yet still have relatively low K-factors. More particularly, the present invention is directed to an improved process for the preparation of closed cell rigid foams. The process broadly comprises reacting a) a polyol component having a hydroxyl number of from about 200 to about 650, and b) an organic polyisocyanate, in the presence of c) a catalyst, d) a foam stabilizer, and e) a blowing agent. The improvement resides in the use of the azeotropic mixture herein as the blowing agent.

The polyols, isocyaantes, catalysts, and foam stabilizers useful herein and the various methods of combining them to produce closed cell, rigid foams are generally known in the art.

The invention is further illustrated but is not intended to be limited by the following examples in which all parts and percentages are by weight unless otherwise specified.

EXAMPLES

In the examples which follow, the following materials were used:

POLYOL A: a 460 OH number polyol prepared by sequentially reacting 1 mole of an 80/20 mixture of 2,4- and 2,6-tolulene diamine with about 3.7 moles of ethylene oxide and then about 3.3 moles of propylene oxide.

POLYOL B: a 395 OH number polyol prepared by sequentially reacting 1 mole of a mixture of 2,3- and 3,4-tolulene diamine with about 3.5 moles of ethylene oxide and then with about 4.5 moles of propylene oxide.

HCFC-141b: 1,1-dichloro-1-fluoroethane.
2-MB: 2-methylbutane.

L-5440: a polyalkyleneoxidedimethylsiloxne copolymer, commercially available from Union Carbide.
PMDTA: pentamethyldiethylenetriamine.
TMEDA: tetramethyletylenediamine.
ISO: Mondur MR isocyanate, a commercially available polymethylene polyphenyl polyisocyanate from Mobay Corporation, having an NCO content of about 32%.

In the examples, the HCFC-141b and 2-MB were first mixed. The ingredients listed in the Table under B-side were then blended. The isocyanate was then mixed in a mixing vessel using an air stirrer. After the mix times noted in the Table, the reaction mixtures were poured into a polyethylene lined 10½"×10½"×2½" cardboard box. The cream times, gel times, densities and K-factors of the systems were as reported in the Table. Example 1 was a comparative example.

TABLE 1

|  | 1 | 2 |
|---|---|---|
| B-SIDE |  |  |
| POLYOL A, pbw | 33.5 | 33.5 |
| POLYOL B, pbw | 33.5 | 33.5 |
| L-5440, pbw | 1.5 | 1.5 |
| PMTDA, pbw | 2.2 | 2.2 |
| TMEDA, pbw | 1.1 | 1.1 |
| HCFC-141b, pbw | 22.4 | 15.59 |
| 2-MB, pbw | — | 6.81 |
| A-SIDE |  |  |
| ISO, pbw | 70.0 | 70.0 |
| RESULTS |  |  |
| Mix time, sec. | 5 | 5 |
| Cream time, sec. | 12 | 9 |
| Gel time, sec. | 29 | 37 |
| Density, pcf. | 1.77 | 1.27 |
| K-factor (BTU-in hr-ft 2) | 0.125 | 0.162 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for the preparation of closed cell, rigid foams by reacting a) a polyol component having a hydroxyl number of from about 200 to about 650, and b) an organic polyisocyanate, in the presence of c) a catalyst, d) a foam stabilizer, and e) a blowing agent, the improvement wherein the blowing agent is an azeotrope composition consisting essentially of from 25% to 35% by weight of 2-methylbutane and from 65% to 75% by weight of 1,1-dichloro-1-fluoroethane.

2. The process of claim 1, wherein said blowing agent consists essentially of from 27% to 33% by weight of 2-methylbutane and from 67% to 73% by weight of 1,1-dichloro-1-fluoroethane.

3. The process of claim 2, wherein said blowing agent consists essentially of 30.4% % by weight of 2-methylbutane and 69.6% by weight of 1,1-dichloro-1-fluoroethane.

* * * * *